(No Model.)
D. W. McKINNON.
FELLY BOLT.
No. 375,177. Patented Dec. 20, 1887.
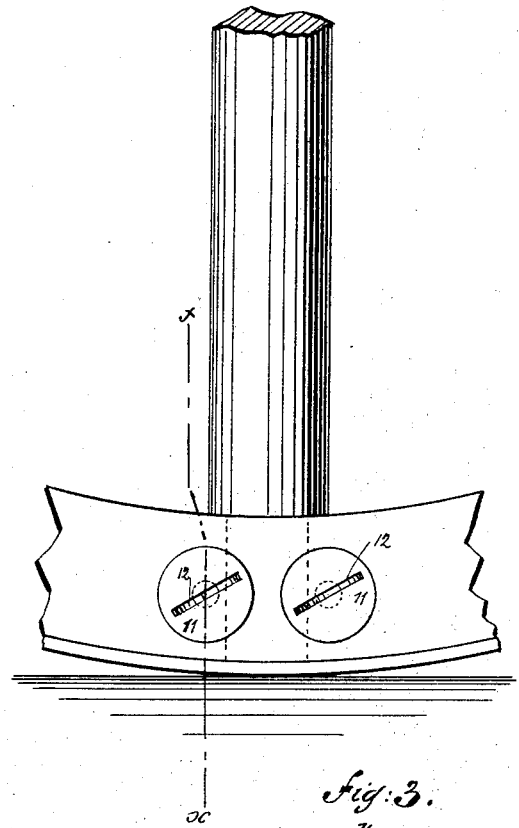
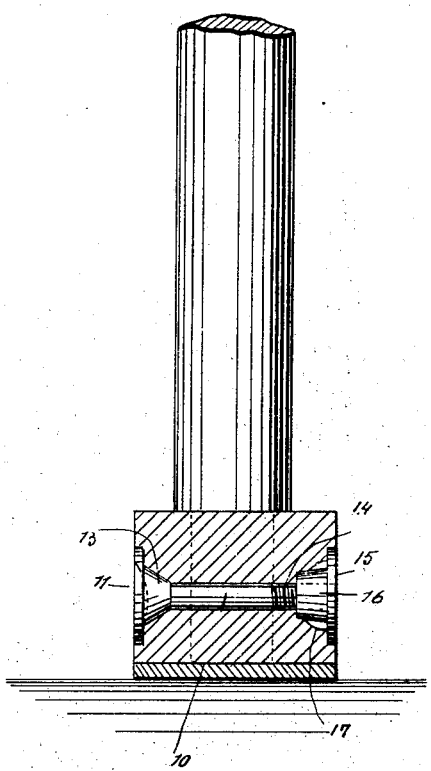
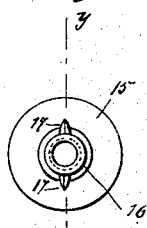
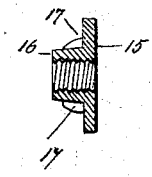
WITNESSES:
INVENTOR:
D. W. McKinnon
BY Munn & Co.
ATTORNEYS.

UNITED STATES PATENT OFFICE.

DUNCAN W. McKINNON, OF NORTH SYDNEY, CAPE BRETON, NOVA SCOTIA, CANADA.

FELLY-BOLT.

SPECIFICATION forming part of Letters Patent No. 375,177, dated December 20, 1887.

Application filed August 3, 1887. Serial No. 246,035. (No model.)

*To all whom it may concern:*

Be it known that I, DUNCAN W. McKINNON, of North Sydney, in the county of Cape Breton, Province of Nova Scotia, and Dominion of Canada, have invented a new and Improved Felly-Bolt, of which the following is a full, clear, and exact description.

This invention relates to a novel form of bolt, the object of the invention being to provide a bolt that shall be useful in many connections, but one which is more especially adapted for use in connection with the fellies of vehicle-wheels, the bolt being used to prevent the splitting of said fellies without detracting from their general appearance; and to the end named the invention consists of a bolt and nut formed with re-enforcing sections, the head of the bolt being nicked after the manner of an ordinary wood-screw.

Reference is to be had to the accompanying drawings, forming a part of this specification, in which similar figures of reference indicate corresponding parts in all the views.

Figure 1 is a side view of a portion of a wheel, representing the same as being provided with my improved form of bolt. Fig. 2 is a sectional view taken on line *x x* of Fig. 1. Fig 3 is a view of the inner face of the nut as it appears when removed from the bolt, and Fig. 4 is a sectional view taken on line *y y* of Fig. 3.

In the drawings, 10 represents a bolt that is formed with a flat head, 11, which has a nick, 12, in its outer face, a re-enforcing section, 13, being formed at the point where the shank joins the head. The end of the shank is threaded, as shown at 14, to engage the nut 15, which nut is a flat disk-like body having a re-enforcing section, 16, upon its inner face, ribs or flanges 17 being formed at the side of the re-enforcing section 16.

In applying the bolt the felly of the wheel is countersunk upon each side of the spoke, and an aperture is bored through the felly. The nut is inserted in one of the countersunk recesses, and the threaded portion of the bolt-shank is brought into engagement with the nut, after which the bolt is turned home by means of a screw-driver that is brought into engagement with its nick 12, the outer face of the bolt-head and the outer face of the nut 15 being brought flush with the side faces of the felly.

By applying the nut as above described the felly will be held from splitting, and the exposed portions of the bolt and nut, being flush with the faces of the felly, will not detract from the general appearance of the wheel.

Although I have described this invention in connection with a felly, it will of course be understood that it could be used in many other ways.

Having thus fully described my invention, I claim as new and desire to secure by Letters Patent—

1. The combination, with a bolt formed with a nicked head and a re-enforcing section, of a disk-like nut formed with a re-enforcing section, substantially as described.

2. The combination, with a bolt formed with a re-enforcing section, 13, and a head, 11, in which there is a nick, 12, of a disk-like nut, 15, formed with a re-enforcing section, 16, and with ribs 17, substantially as described.

DUNCAN W. McKINNON.

Witnesses:
JOHN N. ARMSTRONG,
FRED D. MACKAY.